(12) United States Patent
Fradet et al.

(10) Patent No.: US 10,083,197 B2
(45) Date of Patent: *Sep. 25, 2018

(54) METHOD AND APPARATUS FOR STORAGE OF DATA FOR MANUFACTURED ITEMS

(71) Applicant: Philip Morris USA Inc., Richmond, VA (US)

(72) Inventors: Erwan Fradet, Nyon (CH); Alain Sager, Bossonnens (CH); Patrick Mauroux, Ursy (CH); Patrick Chanez, Cheyres (CH); Philippe Chatelain, Chavornay (CH)

(73) Assignee: Philip Morris USA Inc., Richmond, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/463,050

(22) Filed: Mar. 20, 2017

(65) Prior Publication Data

US 2017/0193027 A1    Jul. 6, 2017

Related U.S. Application Data

(63) Continuation of application No. 14/738,202, filed on Jun. 12, 2015, now Pat. No. 9,665,847, which is a (Continued)

(30) Foreign Application Priority Data

Dec. 22, 2009   (EP) ..................................... 09252859

(51) Int. Cl.
   *G06F 17/30*     (2006.01)
   *G06Q 10/08*    (2012.01)
   *H04L 9/32*      (2006.01)

(52) U.S. Cl.
   CPC ..... *G06F 17/30342* (2013.01); *G06Q 10/087* (2013.01); *H04L 9/3247* (2013.01)

(58) Field of Classification Search
   CPC ............ G06F 17/30342; G06Q 10/087; H04L 9/3247
   See application file for complete search history.

(56) References Cited

U.S. PATENT DOCUMENTS

| | | |
|---|---|---|
| 4,463,250 A | 7/1984 | McNeight et al. |
| 5,892,900 A | 4/1999 | Ginter et al. |

(Continued)

FOREIGN PATENT DOCUMENTS

| | | |
|---|---|---|
| EP | 1719070 A1 | 11/2006 |
| JP | H05151381 A | 6/1993 |

(Continued)

OTHER PUBLICATIONS

European Search Report dated May 7, 2010 for European Patent Application No. 09252859.5-2221.

(Continued)

*Primary Examiner* — Brandon S Hoffman
*Assistant Examiner* — Nega Woldemariam
(74) *Attorney, Agent, or Firm* — Buchanan Ingersoll & Rooney PC

(57) ABSTRACT

Exemplary embodiments are directed to a method and apparatus for storing data for a batch of manufactured items. The method comprises defining in a processor, using a lower limit identifier and an upper limit identifier, a range of unique item identifiers for the batch, wherein each manufactured item in the batch is allocated a unique item identifier falling within the range. The item identifiers are stored in allocated storage space. If an upper limit identifier is specified for each time interval, an amount of storage specified for all manufactured items during a production (Continued)

time period is calculated as a sum of a first product and a second product, the first product being a product of a production time and a size allocated to each upper limit identifier, and the second product being a product of the production time, a total number of manufactured items, and a percentage of unused identifiers.

9 Claims, 2 Drawing Sheets

Related U.S. Application Data continuation of application No. 12/976,662, filed on Dec. 22, 2010, now Pat. No. 9,058,584.

(56) References Cited

U.S. PATENT DOCUMENTS

| | | | |
|---|---|---|---|
| 5,896,293 | A | 4/1999 | Teramoto et al. |
| 5,930,215 | A | 7/1999 | Fite et al. |
| 6,069,955 | A | 5/2000 | Coppersmith et al. |
| 6,122,403 | A | 9/2000 | Rhoads |
| 6,205,060 | B1 | 3/2001 | Sanda et al. |
| 6,212,638 | B1 | 4/2001 | Lee et al. |
| 6,226,619 | B1 | 5/2001 | Halperin et al. |
| 6,260,029 | B1 | 7/2001 | Critelli |
| 6,442,276 | B1 | 8/2002 | Doljack |
| 6,725,366 | B1 | 4/2004 | Swanberg |
| 6,996,543 | B1 | 2/2006 | Coppersmith et al. |
| 7,188,258 | B1 | 3/2007 | Aggarwal et al. |
| 7,201,309 | B2 | 4/2007 | Oakes et al. |
| 7,283,630 | B1 | 10/2007 | Doljack |
| 7,497,379 | B2 | 3/2009 | Chen et al. |
| 8,108,309 | B2 | 1/2012 | Tan |
| 8,317,098 | B2 | 11/2012 | Roth et al. |
| 8,671,062 | B2 | 3/2014 | Sager et al. |
| 2001/0047340 | A1 | 11/2001 | Snow et al. |
| 2003/0074223 | A1 | 4/2003 | Hickle et al. |
| 2005/0234823 | A1 | 10/2005 | Schimpf |
| 2006/0080190 | A1* | 4/2006 | Furukawa .............. G06Q 10/08 705/28 |
| 2008/0046263 | A1 | 2/2008 | Sager et al. |
| 2008/0093448 | A1 | 4/2008 | de la Huerga |
| 2008/0189150 | A1 | 8/2008 | Knipfer et al. |
| 2009/0159666 | A1 | 6/2009 | O'Brien et al. |
| 2009/0230190 | A1 | 9/2009 | Chanez et al. |
| 2009/0309733 | A1 | 12/2009 | Moran et al. |
| 2012/0102334 | A1* | 4/2012 | O'Loughlin ............ G06F 21/57 713/189 |
| 2014/0122353 | A1 | 5/2014 | Sager et al. |

FOREIGN PATENT DOCUMENTS

| | | |
|---|---|---|
| JP | H09258390 A | 10/1997 |
| JP | 2002145418 A | 5/2002 |
| JP | 2003208234 A | 7/2003 |
| JP | 2004348720 A | 12/2004 |
| KR | 100911762 B1 | 8/2009 |
| RU | 2216776 C2 | 11/2003 |
| WO | WO-8803273 A1 | 5/1988 |
| WO | WO-2006038114 A1 | 4/2006 |

OTHER PUBLICATIONS

"Erklarung gemalJ der Mitteilung des Europaischen Patentamts" vom 1. Oct. 2007 uber Geschaftsmethoden (AB1, EPA Nov. 2007, 592-593) Journal Nov. 2007, 592 XP002456252 (in the German language).

* cited by examiner

METHOD AND APPARATUS FOR STORAGE OF DATA FOR MANUFACTURED ITEMS

CROSS REFERENCE TO RELATED APPLICATION

This application is a continuation application of U.S. application Ser. No. 14/738,202, filed on Jun. 12, 2015, which is a continuation application of U.S. application Ser. No. 12/976,662, filed on Dec. 22, 2010, which corresponds to and claims priority under 35 U.S.C. § 119 to European Application No. 09252859.5, filed Dec. 22, 2009. The entire contents of each prior application is hereby incorporated by reference.

FIELD

The present disclosure relates to a batch of manufactured items, such as method and apparatus for storage of data for a batch of manufactured items, a method for a party to identify a manufactured item in the batch, and a method for a party to determine a total number of items manufactured in the batch.

WORKING ENVIRONMENT in the context of data storage and transmission, "serialization" is the process of converting an object, such as a unique serial number, into a sequence of bits so that it can be persisted on a storage medium or transmitted across a communications link. The serialization may be secure or non-secure. That is to say, the unique serial number may or may not be protected with a cryptographic mechanism, such as, but not limited to, encryption and digital signature.

Serialization may be used for identifying individual manufactured items during a manufacturing process. Manufactured items are produced in batches. After a batch run has been started, the individual manufactured items are marked with a unique serial number (also known as an identifier). Regulations, such as quality control regulations and taxation regulations, are increasingly being introduced to require manufacturers to be able to securely identify, authenticate and trace items during the manufacturing process. This is particularly important for goods where quality is critical and inferior quality is detrimental to the customer and to the manufacturer. In addition, for goods where quality or brand value is critical, counterfeiting may cause significant loss of revenue and reputation, and should be combated as far as possible.

Serialization may be used for later identification by manufacturers, distributors, retailers and end users. It may also be used for other parties outside the manufacturing, distribution and retail process, such as national authorities and regulators. Authorized parties may need to able to determine the actual number of items manufactured, for example, for tax reasons. This is known as volume verification.

For all the items in a particular manufacturing batch, the identifiers may be derived from a single set. For example, the identifiers may all include a batch identifier. That is to say, an identifier is used which may explicitly identify the batch during which a unit was produced. Alternatively, an identifier may be used to implicitly identify the batch during which a unit was produced. For example, the identifier may define the production details (place, date, time etc) which, in turn, points to a particular batch. Such an identification code may provide information regarding production, and can be used to trace the item through the manufacturing and distribution process.

In addition, it is often the case that a batch of identifiers is produced for a batch of items, but not all the identifiers are used for the items that are actually manufactured. This may be for various reasons. For example, there may be gaps and reordering of items in the manufacturing process, which makes it convenient to have gaps and reordering in the identifiers actually used. There may also be products identified later in the manufacturing process which are rejected for quality reasons.

There are clearly advantages in using serialization for manufactured items during a manufacturing process. However, when the manufacturing process is a high-speed manufacturing process, in which a large number of items are being produced at a high production rate, the amount of storage space required for the serialization will be large. This results in data storage requirements which are potentially prohibitive. In addition, if the data needs to be transmitted across a communications link, this will require a potentially prohibitively large bandwidth.

Therefore, there exists a need for an improved method and apparatus for storage of data for a batch of manufactured items, particularly for serialization of a batch of manufactured items.

SUMMARY

An exemplary embodiment is directed to a method for storage of data for a batch of manufactured items. The method includes defining, by a lower limit identifier and an upper limit identifier, a range of unique item identifiers for the batch, wherein each manufactured item in the batch is allocated a unique item identifier falling within the range. The number of unique item identifiers allocated to the manufactured items is smaller than the number of unique item identifiers in the range. The unique item identifiers allocated to the manufactured items are defined by the lower limit item identifier of the range, the upper limit item identifier of the range, and an indication of those item identifiers in the range which are not allocated to a manufactured item.

Another exemplary embodiment is directed to a method for a second party to identify a manufactured item. The method includes a first party performing a method for storage of data for a batch of manufactured items defining, by a lower limit identifier and an upper limit identifier, a range of unique item identifiers for the batch, wherein each manufactured item in the batch is allocated a unique item identifier falling within the range. The number of unique item identifiers allocated to the manufactured items is smaller than the number of unique item identifiers in the range. The unique item identifiers allocated to the manufactured items are defined by the lower limit item identifier of the range, the upper limit item identifier of the range, and an indication of those item identifiers in the range which are not allocated to a manufactured item. The first party sends to the second party the range of unique item identifiers for the batch.

Furthermore, an exemplary embodiment is directed to a method for a second party to determine a total number of items manufactured in a batch. The method includes a first party performing a method for storage of data for the batch of manufactured items that includes defining, by a lower limit identifier and an upper limit identifier, a range of unique item identifiers for the batch, wherein each manufactured item in the batch is allocated a unique item identifier falling within the range. The number of unique item identifiers allocated to the manufactured items is smaller than the number of unique item identifiers in the range. The unique item identifiers allocated to the manufactured items are defined by the lower limit item identifier of the range, the upper limit item identifier of the range, and an indication of those item identifiers in the range which are not allocated to a manufactured item. The first party sends to the second party the range of unique item identifiers for the batch and the first party sends to the second party the indication of those item identifiers in the range which are not allocated to a manufactured item in the batch. The range of unique item identifiers and the indication of those item identifiers not allocated to a manufactured item may be used by the second party to determine the number of items manufactured in the batch.

BRIEF DESCRIPTION OF THE DRAWINGS

The exemplary embodiments will be further described, by way of example only, with reference to FIGS. 1 to 3, in which.

DETAILED DESCRIPTION

Figure 1:
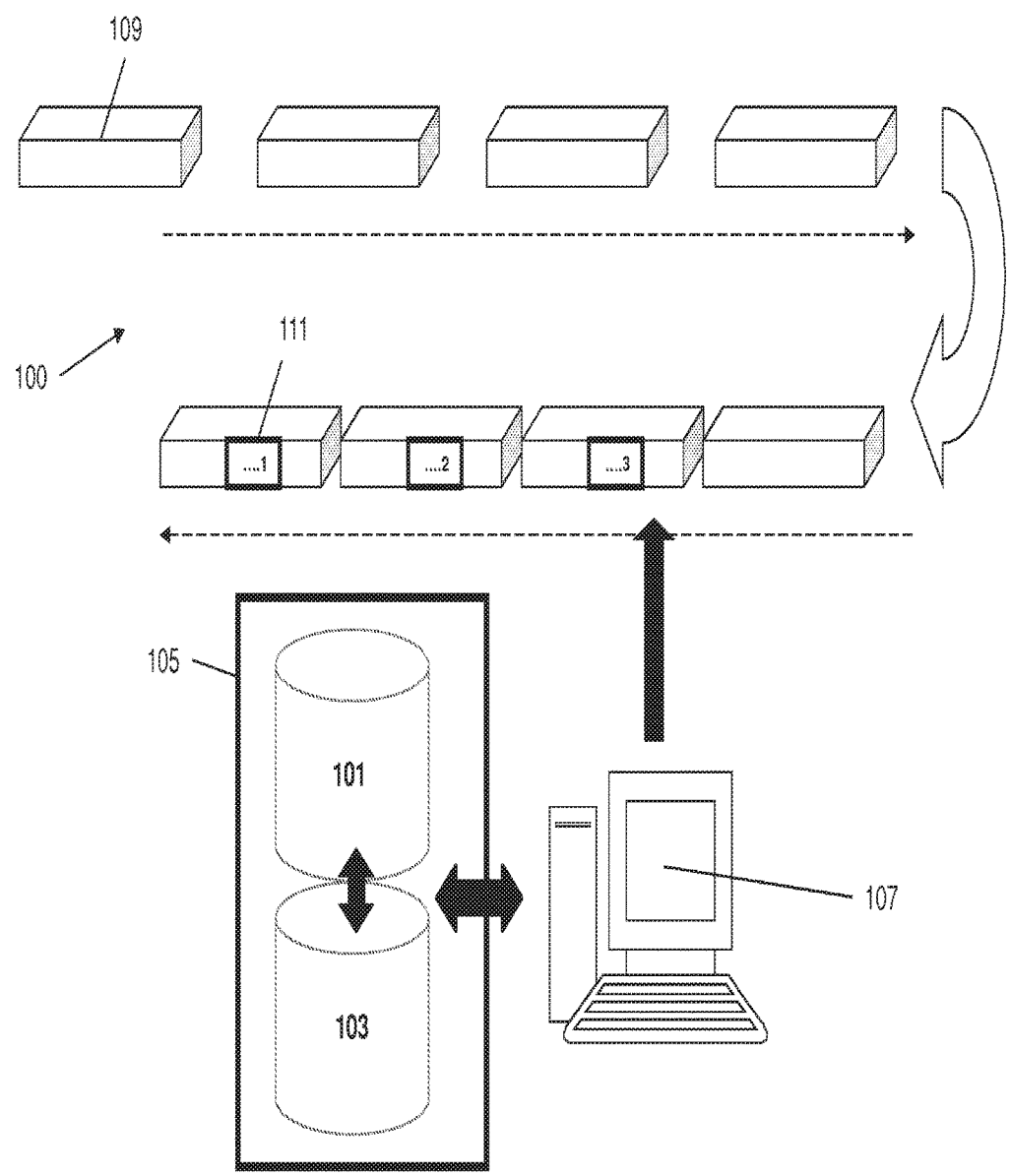
FIG. 1 shows a method for applying item identifiers to manufactured items at the production line in accordance with an exemplary embodiment.

According to a first aspect of the present disclosure there is provided a method for storage of data for a batch of manufactured items. The method includes defining, by a lower limit identifier and an upper limit identifier, a range of unique item identifiers for the batch, wherein each manufactured item in the batch is allocated a unique item identifier falling within the range. The number of unique item identifiers allocated to the manufactured items is smaller than the number of unique item identifiers in the range, and the unique item identifiers allocated to the manufactured items are defined by the lower limit item identifier of the range, the upper limit item identifier of the range, and an indication of those item identifiers in the range which are not allocated to a manufactured item.

According to the present disclosure there is also provided a method for storage of data for a batch of manufactured items. The method includes defining, by a lower limit identifier and an upper limit identifier, a range of unique item identifiers for the batch, wherein each manufactured item in the batch is allocated a unique item identifier falling within the range. The number of unique item identifiers allocated to the manufactured items is smaller than the number of unique item identifiers in the range, and the unique item identifiers allocated to the manufactured items are defined by the lower limit item identifier of the range, the upper limit item identifier of the range and a representation of those item identifiers in the range which are not allocated to a manufactured item.

By defining the unique item identifiers that are actually allocated to manufactured items with reference to a range including a larger number of unit identifiers, gaps, reordering, and rejects in the manufacturing process can be taken into account. The manufacturer is free to use as many identifiers from the range as are actually required. Those identifiers not used by the manufacturer may not be potentially used by counterfeiters. This means that the precise number of manufactured items in a batch does not need to be pre-defined. This also means that one size of range can be used for data storage for several different types and sizes of batches. In addition, by defining the unique item identifiers that are actually allocated to manufactured items by indicating, prompting or representing those item identifiers in the range which are not used, the data storage requirements may be reduced.

The method of the first embodiment of the present disclosure allows for storage of data for a batch of manufactured items. The method of the first aspect of invention allows individual manufactured items to be identified. This may allow manufacturers and distributors to trace the items during the manufacturing and supply chain. This may also allow third parties to verify that a particular manufactured item is genuine and to determine production details for an individual manufactured item. The method may also allow the manufacturer or a third party to determine the precise number of items manufactured, that is, to perform volume verification.

Each manufactured item may be a discrete item for an end-user. Alternatively, each manufactured item may be a container for other units. In the case of tobacco products, each manufactured item may be a pack, carton or shipping case of smoking articles, or a pallet for shipping cases. In the case of other manufactured items, each manufactured item could be an individual box or bag, a container of similar items, a shipping container, or a pallet for shipping containers.

In some embodiments, data representing the lower limit item identifier of the range is stored. In other embodiments, data representing the lower limit item identifier is not stored, for example where the identifier exemplary used as the lower limit is an industry standard or always a known value. Data representing the upper limit item identifier of the range is stored. The "indication" of those item identifiers in the range which are not allocated to a manufactured item may take a number of forms, as long as those item identifiers in the range not allocated to a manufactured item can be established. The indication may comprise a representation, a signal or a prompt. The indication may comprise storage of data representing those item identifiers in the range not allocated to a manufactured item. Alternatively or additionally, the indication may comprise an external input, for example from a computer program, a device such as a printer or camera, or another device. Or, the indication may comprise an input from a human operator who scans the items as they move through the manufacturing line.

In one embodiment, the indication of those item identifiers in the range which are not allocated to a manufactured item includes an indication of one or more individual item identifiers which are not allocated to a manufactured item.

Additionally or alternatively, the indication of those item identifiers in the range which are not allocated to a manufactured item may comprise an indication of one or more further ranges of item identifiers which are not allocated to a manufactured item.

Whether the item identifiers in the range not allocated to a manufactured item are indicated or represented as one or more non-allocated individual item identifiers, as one or more non-allocated ranges of item identifiers or as both non-allocated individual item identifiers and non-allocated ranges of item identifiers, will depend on the particular item identifiers in the range which are not allocated to manufactured items. In some cases, storage requirements will be reduced if the item identifiers in the range not allocated to a manufactured item are indicated or represented as non-allocated ranges. In some other cases, storage requirements will be reduced if the item identifiers in the range not allocated to a manufactured item are indicated or represented as non-allocated individual item identifiers. In some other cases, storage requirements will be reduced if the item identifiers in the range not allocated to a manufactured item are indicated or represented as both non-allocated individual item identifiers and non-allocated ranges of item identifiers. The storage used will be that requiring the least amount of space.

For example, it may be the case that where a single consecutive item identifier is not allocated to a manufactured item, the storage requiring the least amount of space is as a non-allocated individual item identifier. For example, it may be the case that where three or more consecutive item identifiers are not allocated to a manufactured item, the storage requiring the least amount of space is as a non-allocated range of item identifiers. For example, it may be the case that where two consecutive item identifiers are not allocated to a manufactured item, the storage requiring the least amount of space is either as non-allocated individual item identifiers or as a non-allocated range of item identifiers. This would depend on the specifics of data storage.

When the indication of those item identifiers in the range which are not allocated to a manufactured item comprises an indication of one or more non-allocated ranges, each non-allocated range may be defined by a lower limit item identifier and an upper limit item identifier.

In one embodiment, each identifier is derived by generating an identification code, providing a plurality of secret codes, and digitally signing the identification code by means of a secret derived from the plurality of secret codes. The plurality of secret codes are provided to a checking centre for authenticating identifiers on the manufactured items. In that embodiment, the unsigned and signed identification codes may not need to be stored. However, the identification codes may be stored if required.

In one embodiment, each item identifier comprises production details associated with the respective manufactured item.

In an alternative embodiment, each item identifier is an encrypted version of production details associated with the respective manufactured item.

In that embodiment, the identifier itself is not stored; only the production details and an encryption key used for the encryption are stored.

The production details for each manufactured item includes one or more of: production location, production date, production time, and a counter value of an incremental counter. The production details are unique to each manufactured item. In order to achieve this, in one embodiment, the production details comprise only the counter value of the incremental counter. In an alternative embodiment, the production details comprise only the production time. However, in an exemplary embodiment, the production details comprise the production location, the production date, the production time and the counter value of the incremental counter. In that embodiment, the incremental counter may be reset each time period.

The production location may comprise one or both of the production centre and the specific production line, or the Code Generator Identification. The Code Generator Identification is an identifier uniquely identifying the point where the identifier is generated. The production time may be specified as accurately as desired and this will probably depend on the speed of production of the manufactured items. For example, the production time may be specified in terms of hours only. Alternatively, the production time may be specified in terms of hours and minutes. Alternatively, the production time may be specified in terms of hours, minutes and seconds.

The method may further comprise the step of marking each manufactured item in the batch with the respective allocated item identifier.

The method of the first aspect of the present disclosure may be incorporated into the manufacturing process for the items.

According to a second embodiment of the invention, there is provided a method for a second party to identify a manufactured item. The method includes the steps of a first party performing a method for storage of data for a batch of manufactured items according to the method of the first aspect of the invention, and the first party sending to the second party the range of unique item identifiers for the batch.

In that case, the second party can identify and verify, from the range, the particular manufactured item. However, because only the range of unique item identifiers, as defined by the lower limit identifier and the upper limit identifier, is sent to the second party, this greatly reduces transmission requirements. Note that, although the range of unique item identifiers is defined by the upper and lower limit identifiers, it is often not necessary to send the lower limit identifier to the second party. For example, the lower limit item identifier may be pre-defined, for example in accordance with an industry standard, in which case sending only the upper limit item identifier will satisfactorily define the range.

In one embodiment, the method further comprises the step of the first party sending to the second party the indication of those non-allocated item identifiers in the range, that is to say, those item identifiers which are not allocated to a manufactured item.

In that case, from the range, together with the indication of those item identifiers in the range which are not allocated to a manufactured item, the second party can determine the item identifiers actually used. However, because the individual identifiers do not need to be stored or transmitted, this greatly reduces storage and transmission requirements and increases the security of the storage and transmission.

According to a third embodiment of the present disclosure, there is provided a method for a second party to determine a total number of items manufactured in a batch. The method includes the steps of a first party performing a method for storage of data for the batch of manufactured items, the first party sending to the second party the range of unique item identifiers for the batch, and the first party sending to the second party the indication of those item identifiers in the range which are not allocated to a manufactured item in the batch. The range of unique item identifiers and the indication of those item identifiers not allocated to a manufactured item may be used by the second party to determine the number of items manufactured in the batch.

In that case, from the range, together with the indication of those item identifiers in the range which are not allocated to a manufactured item, the second party can determine the precise number of items manufactured in the batch and the item identifiers used. That is to say, the second party may perform volume verification. This may be particularly useful for tax or regulatory reasons. However, because the individual identifiers do not need to be transmitted, this greatly reduces transmission requirements and increases the security of the transmission. Note again that, although the range of unique item identifiers is defined by the upper and lower limit identifiers, it is often not necessary to send the lower limit identifier to the second party. For example, the lower limit item identifier may be pre-defined, for example in accordance with an industry standard, in which case sending only the upper limit item identifier will satisfactorily define the range.

The first party may be a manufacturer or distributor. Alternatively, the first party may be an external party specializing in serialization. The second party may be a verifying party, for example a regulator or national authority.

According to a fourth embodiment of the present disclosure, there is provided a manufactured item identified according to the method of the first aspect of the present disclosure.

According to a fifth embodiment of the present disclosure, there is provided apparatus for storage of data for a batch of manufactured items. The apparatus includes means for defining, by a lower limit identifier and an upper limit identifier, a range of unique item identifiers for the batch, wherein each manufactured item in the batch is allocated a unique item identifier falling within the range. The number of unique item identifiers allocated to the manufactured items is smaller than the number of unique item identifiers in the range, and the unique item identifiers allocated to the manufactured items are defined by: the lower limit item identifier of the range, the upper limit item identifier of the range, and an indication of those item identifiers in the range which are not allocated to a manufactured item.

The apparatus of the fifth embodiment of the present disclosure allows for storage of data for a batch of manufactured items. The apparatus of the fifth embodiment of the present disclosure allows individual manufactured items to be identified. This may allow manufacturers and distributors to trace the items during the manufacturing and supply chain. This may also allow third parties to verify that a particular manufactured item is genuine and to determine production details for an individual manufactured item. The apparatus may also allow the manufacturer or a third party to determine the precise number of items manufactured, that is, to perform volume verification.

The indication of those item identifiers in the range which are not allocated to a manufactured item may comprise an indication of one or more individual item identifiers which are not allocated to a manufactured item.

Additionally or alternatively, the indication of those item identifiers in the range which are not allocated to a manufactured item may comprise an indication of one or more further ranges which are not allocated to a manufactured item.

Whether the item identifiers in the first range not allocated to a manufactured item are identified or represented as one or more non-allocated individual item identifiers, as one or more non-allocated ranges of item identifiers or as both non-allocated individual item identifiers and non-allocated ranges of item identifiers, will depend on the particular item identifiers in the range which are not allocated to manufactured items.

In one embodiment, each identifier is derived by: generating an identification code; providing a plurality of secret codes; and digitally signing the identification code by means of a secret derived from the plurality of secret codes, wherein the plurality of secret codes are provided to a checking centre for authenticating identifiers on the manufactured items. In that embodiment, the unsigned and signed identification codes may not need to be stored. However, the identification codes may be stored if required.

In one embodiment, each item identifier comprises production details associated with the respective manufactured item.

In an alternative embodiment, each item identifier is an encrypted version of production details associated with the respective manufactured item.

The apparatus may further comprise means for marking each manufactured item in the batch with the respective allocated item identifier.

The apparatus may be incorporated into apparatus for manufacturing the items.

Features described in relation to one aspect of the present disclosure may also be applicable to another aspect of the present disclosure.

FIG. 1 shows an exemplary method for implementing an embodiment of the present disclosure at the production line. Before production of a particular batch begins at production line 100, the processor 107 defines a range 101 of item identifiers to be used for the batch of manufactured items. In this embodiment, that range 101 is stored in database 105, accessible to processor 107.

During production, each manufactured item 109 is applied with an item identifier 111 (either directly or onto packaging or a label). The item identifiers 111 actually used for the manufactured items are selected from the entire range 101. In this embodiment, the identifiers actually used are stored in the database at 103.

In this embodiment, the item identifiers actually used are stored in database 103 and typically a large amount of such information is required, as many batches may be manufactured. The identifiers can be used for later identification by manufacturers and distributors as well as parties outside the manufacturing and distribution process such as national authorities and regulators.

Figure 2:
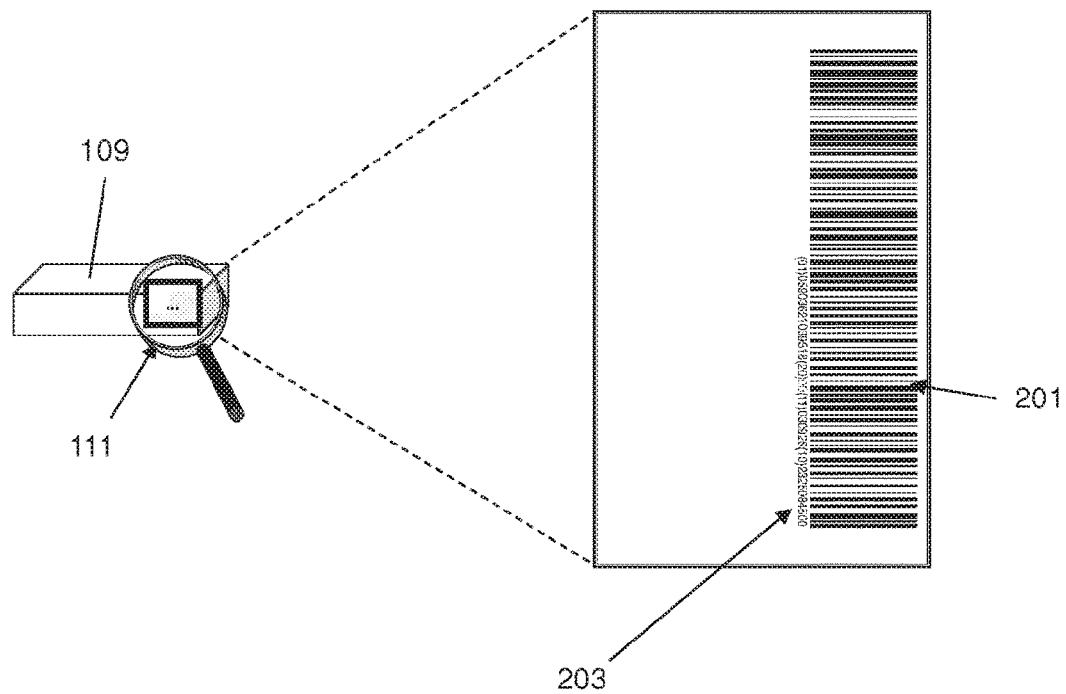
FIG. 2 shows a manufactured item having an identifying label including the manufactured item's unique identifier in accordance with an exemplary embodiment.

FIG. 2 shows a manufactured item 109 having an identifier 111. In the embodiment of FIG. 2, the manufactured item identifier 111 comprises two portions: a machine-readable identifier 201 and a human-readable identifier 203. In the embodiment of FIG. 2, the human-readable identifier 203 is a 40 digit number. The 40 digit number is encoded into an EAN-128 (also known as GS1-128) barcode which forms the machine-readable identifier 201. The identifier 203, and hence the identifier 201, are unique for each particular manufactured item. In this embodiment, the identifiers 201 and 203 typically identify information including, but not limited to, the production date (YYMMDD), the production time (HHMMSS), the production centre, and the case packer number. The customer recipient of the shipping case may also be identified if already known.

Figure 3:
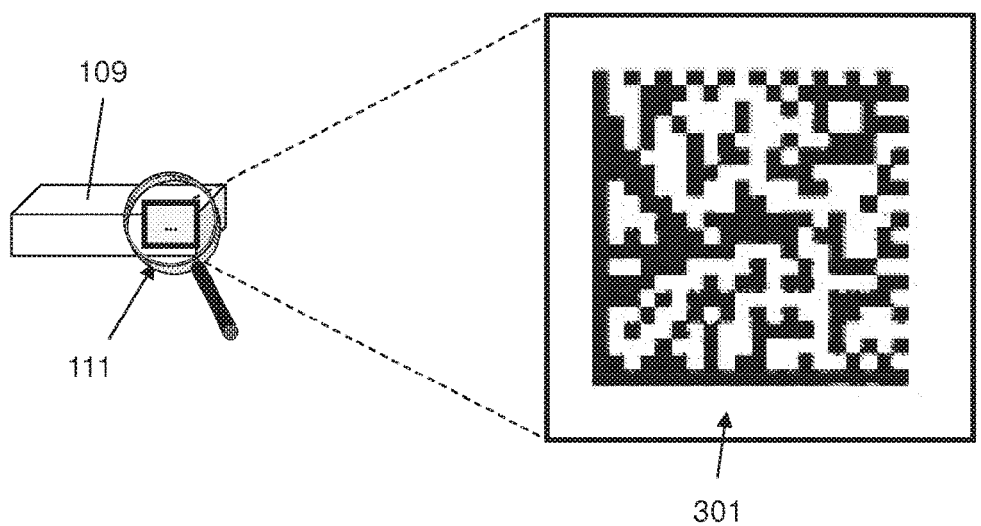
FIG. 3 shows a manufactured item having an identifying label including the manufactured item's unique identifier in accordance with an exemplary embodiment.

FIG. 3 shows a manufactured item 109 having an identifier 111. In the embodiment of FIG. 3, the manufactured item identifier 111 comprises a 12-digit alphanumeric code coded into a 2D barcode in the form of a data matrix 301. The 12-digit code may also be printed onto the manufactured item directly or onto packaging or a label for the manufactured item. Other forms of identifiers may also be used.

The serialization may be secure or non-secure. That is to say, the identifier used on a manufactured item may or may not be encrypted. Thus, third parties may or may not be able to derive information from the identifier. In one embodiment, each identifier comprises an identification code plus a signature. The identification code may be encrypted. The signature is generated from a secret derived from a plurality of secret codes. The plurality of secret codes may be pre-calculated random codes. The secret may be derived additionally from the identification code itself. In that embodiment, there is no need for the identification codes themselves to be stored. But, the plurality of secret codes may be used to authenticate that a particular identification code is genuine.

As already discussed, it is often advantageous for a manufacturer to define a batch of identifiers for a batch of items, but not use all the identifiers for the items that are actually manufactured. In that case, there needs to be a way to unequivocally determine whether a particular code on an unverified item is a genuine code that was actually used for a manufactured item or is a genuine code that was not, in fact, used for a manufactured item. In this way, a third party can determine the volume of products manufactured. In addition, the third party may then verify that the volume of products manufactured, according to the manufacturer's claims does, in fact, correspond to the actual volume of products manufactured. This may be important for a number of reasons, for example, tax or regulatory reasons. In addition, if a particular code is found to be genuine, but not actually allocated to a manufactured item, this would reveal the item in question to be a counterfeit.

The present applicant has previously proposed a method for serialization of a batch of manufactured items. In that method, a range of item identifiers for the batch are defined at the outset. The identifiers, based on time information and using an incremental counter for a minimal time interval (that is to say, production time), are then used for serialization. The incremental counter will be reset at the start of each minimum time interval. The minimum time interval may be specified as accurately as desired and, as already mentioned, this will depend on the speed of production. For example, the minimum time interval may be specified in terms of hours, minutes, seconds or any combination thereof.

Each manufactured item identifier may be a 12-digit alphanumeric code. On the manufactured item itself, the 12-digit alphanumeric code may be coded into a 2D barcode in the form of a data matrix as shown in FIG. 3. The 12-digit code may also be printed onto the manufactured item in a human readable form. The actual item identifiers used during the minimal time interval do not comprise the entire range of item identifiers that have been defined. The item identifiers that are stored or transmitted to a second party are the individual item identifiers that are actually used for every minimal time interval within the batch.

Because every 12-digit alphanumeric code used must be stored, this requires a large amount of storage or transmission capability. Consider a specific example implementing the method previously proposed by the applicant. If identifiers 1 to 19, 21 to 48 and 50, of 50 identifiers defined for a minimal time interval within a batch are actually used, then the following data needs to be stored or transmitted.

TABLE 1

| Manufactured Item Within Time Interval N | Manufactured Item Identifier |
| --- | --- |
| N1 | 12-digit alphanumeric code 1 |
| N2 | 12-digit alphanumeric code 2 |
| ... | ... |
| N19 | 12-digit alphanumeric code 19 |
| N20 | 12-digit alphanumeric code 21 |
| ... | ... |
| N47 | 12-digit alphanumeric code 48 |
| N48 | 12-digit alphanumeric code 50 |

If each 12-digit alphanumeric code requires 8 Bytes of storage (assuming only upper case characters and digits), this will require 48=8 Bytes 384 Bytes of storage for the minimum time interval within the batch. Given the huge numbers of smoking articles produced worldwide, the database size required will be enormous and the transmission bandwidth required will be enormous because, in this example, 8 Bytes per smoking article will be required.

An embodiment of the present disclosure provides a method for storage of data for a batch of manufactured items that decreases the amount of data storage or transmission required.

In this embodiment, each minimal interval within the batch of manufactured items is described as a reporting interval. Each manufactured item identifier may be a 12-digit alphanumeric code. On the manufactured item itself, the 12-digit alphanumeric code may be coded into a 2D barcode in the form of a data matrix as shown in FIG. 3. The 12-digit code may also be printed onto the manufactured item in a human readable form. The actual item identifiers used do not comprise the entire range of item identifiers that have been defined.

According to this embodiment, the item identifiers stored or transmitted to a second party are defined by reference to the upper limit of the defined range of item identifiers within the reporting interval together with those item identifiers that are not actually used for a manufactured item. The lower limit of the defined range of item identifiers is also defined but, in some examples, need not be stored or transmitted. For example, if the standard practice is to define, say, zero as the lower limit identifier then this value is not stored, (Note that, if no items have been manufactured during the reporting interval, no information will be reported.) This is different from the previously proposed method in which all the individual identifiers that are actually used are stored or transmitted.

Consider the example above applied to this exemplary embodiment. Using the same identifiers within the similar minimal time interval as used above (that is identifiers 1 to 19, 21 to 48 and 50, of 50 identifiers defined for a minimal time interval within a batch), the following data needs to be stored or transmitted:

TABLE 2

| Manufactured Item Within Time Interval N | Manufactured Item Identifier Range |
| --- | --- |
| N1 to N48 | 12-digit alphanumeric code 50 less: 12-digit alphanumeric code 20, and 12-digit alphanumeric code 49 |

Note in Table 2 that the 12-digit alphanumeric code 1 is defined as the lower limit. As long as this has been predefined and all parties are aware that this is the case, that lower limit does not need to be explicitly stored. Because the lower limit identifier does not require storage, in this example, 1 upper limit identifier and 2 individual identifiers will need to be stored or transmitted. This will require (1×8 Bytes)+(2×8 Bytes)=24 Bytes of storage. Compared with the previous example, this has reduced the storage required from 384 Bytes to 24 Bytes: a reduction of the order of 16.

As an additional example, we will assume a production time of 8 hours with an efficiency of 50%. That is to say, only 50% of the possible manufactured items are produced during this time period. We assume a reporting interval of 1 minute, with 50 items being produced per reporting interval and 1% of the serialized item identifiers not actually being used on manufactured items.

In the previous method, the storage required for all the manufactured items for that production period corresponds to:

8 (hours)×60 (minutes)×50 (items)×50% (efficiency)× 99% (usage)×8 Bytes

=95.04 kBytes of storage.

In accordance with an embodiment of the present disclosure, the storage required for all the manufactured items for that production period would correspond to:

[8 (hours)×60 (minutes)×8 Bytes (for an upper limit for each time interval)]

+[8 (hours)×60 (minutes)×50 (items)×1% (unused)×8 Bytes]

=5.76 kBytes of storage, which is a reduction of the order of 16.

Alternatively, if a lower limit identifier for each time interval is required, the storage required for all the manufactured items for that production period corresponds to:

[8 (hours)×60 (minutes)×16 Bytes (for both upper and lower limits)]

+[8 (hours)×60 (minutes)×50 (items)×1% (unused)×8 Bytes]

=9.6 kBytes of storage, which is a reduction of the order of 10. This still represents a significant reduction in data storage.

In an exemplary embodiment, each identifier is an encrypted version of the following information: the code generator identification that generates the code, the production date and time, and an incremental counter reset at the start of each minute (in this case, a minute is the minimal time interval and reporting interval). Thus, each identifier is an encrypted version of production details of the respective manufactured item. Thus, the manufactured item identifier information might be as shown in Table 3.

TABLE 3

| Manufactured Item Identifier | Code Generator identification | Production Date & Time | Counter |
|---|---|---|---|
| ... | ... | ... | ... |
| L73Q2M5JQC47 | 116 | 23 Nov. 2007 10:11 | 86 |
| 7S6UAJBL3U62 | 116 | 23 Nov. 2007 10:11 | 87 |
| 4XJLKTND82CH | 116 | 23 Nov. 2007 10:11 | 88 |
| CSY6KVHK4MTC | 116 | 23 Nov. 2007 10:11 | 89 |
| C6SY9V53CXB6 | 116 | 23 Nov. 2007 10:11 | 90 |
| HVD31USQ0U0V | 116 | 23 Nov. 2007 10:12 | 1 |
| DBJ2UBX5RWCC | 116 | 23 Nov. 2007 10:12 | 2 |
| ELQU4CJNAL57 | 116 | 23 Nov. 2007 10:12 | 3 |
| PWA2E2TZYCWK | 116 | 23 Nov. 2007 10:12 | 4 |
| 9UB9ASGG20F6 | 116 | 23 Nov. 2007 10:12 | 5 |
| U26V5VKG8WCH | 116 | 23 Nov. 2007 10:12 | 6 |
| ... | ... | ... | ... |

Note that Table 3 shows the connection between the encrypted item identifier (12-digit alphanumeric code) and the production details. Since, in this embodiment, the identifier is the production details, in encrypted form, there is no need to store both the item identifier and the production details, as long as the key used for encryption is known. Thus, Table 3 may not represent what is actually stored. Due to the incremental counter, the production details for each manufactured item are unique, even if several items are produced each minute.

The embodiment of Table 3 can be applied to the example above. Rather than the 12-digit alphanumeric codes being stored or transmitted, the production details themselves are stored or transmitted. The code generator identification will require 2 Bytes of storage. The production date and time will require 4 Bytes of storage. The counter will require 2 Bytes of storage. Therefore, each item identifier will again require (2+4+2)=8 Bytes of storage.

In the case of the previously proposed method, 48 individual identifiers reported during the same interval will need to be stored or transmitted to a third party. Thus, the reporting interval of 48 packs of cigarettes will require 48×8 Bytes=384 Bytes of storage.

In the case of the exemplary embodiment that includes assuming the lower limit is pre-defined and need not be stored, 1 upper limit identifier and 2 individual identifiers will need to be stored or transmitted to a third party. Thus, the batch will require (1×8)+(2×8)=24 Bytes of storage. This is a reduction by a factor of approximately 16. In fact, it is possible to store only the individual incremental counter of the items not manufactured. That is to say, the non-allocated individual identifiers can be represented simply by the incremental counter, which requires only 2 Bytes of storage. Thus, the batch may require only (1×8)+(2×2)=12 Bytes of storage. This is a reduction by a factor of approximately 32.

Even if the lower limit is required to be stored, the batch will only require (1×8)+(1×8)+(2×8)=32 Bytes of storage, or (1×8)+(1×8)+(2×2)=20 Bytes of storage if the non-allocated individual identifiers can be represented simply by the incremental counter. This is still a large reduction in storage requirements.

Returning to the previous additional example, we will assume a production time of 8 hours with an efficiency of 50%. That is to say, only 50% of the possible manufactured items are produced during this time period. We also assume a reporting interval of 1 minute, with 50 items being produced per reporting interval and 1% of the serialized item identifiers not actually being used on manufactured items.

In the previous method, the storage required for all the manufactured items for that production period corresponds to 8 (hours)×60 (minutes)×50 (items)×50% (efficiency)× 99% (usage)×3 Bytes =95.04 kBytes of storage.

In accordance with an exemplary embodiment, the storage required for all the manufactured items for that production period (assuming that each non-allocated individual identifier can be represented simply by the incremental counter) corresponds to:

[8 (hours)×60 (minutes)×8 Bytes (for an upper limit for each time interval)]

+[8 (hours)×60 (minutes)×50 (items)×1% (unused)×2 Bytes]

=4.32 kBytes of storage, which is a reduction of the order of 22.

Alternatively, if a lower limit identifier for each time interval is required, the storage required for all the manufactured items for that production period corresponds to:

[8 (hours)×60 (minutes)×16 Bytes (for both upper and lower limits)]

+[8 (hours)×60 (minutes)×50 (items)×1% (unused)×2 Bytes]

=8.16 kBytes of storage, which is a reduction of the order of 66. This still represents a significant reduction in data storage.

The example above describes only a relatively small number of manufactured items. In fact, the benefits of the exemplary embodiments become even more apparent when a large number of items are manufactured and hence a large number of item identifiers need to be stored or transmitted. For example, with a counter range of 400, rather than 50, in the example above, the embodiment of the present disclosure could provide a reduction in storage of the order of 100.

This exemplary embodiment may be used in conjunction with the production line shown in FIG. 1. In that case, before production of a particular batch begins, the processor defines a range of item identifiers to be used for the batch. During production, each manufactured item is applied with an item identifier. The item identifiers actually used for the manufactured items are selected from the entire range. Firstly, a printer or other device which performs application of the item identifiers onto the items may simply not produce or use certain item identifiers from the pre-defined range. This may be for a variety of reasons. That device will then indicate the unused identifiers to the generator which generated the original range of identifiers. Or, even if the item identifiers are applied to a manufactured item, they may subsequently be rejected. For example, a camera on the production line may reject a code as illegible, and reject that item as it is moving along the production line. Or, a human operator may reject a code as illegible or remove an item for another reason (such as for quality control or as a sample). In that case, the human operator will identify the rejected identifier, for example by scanning the identifier using a camera which reads the identifier. Again, the unused identifiers will be indicated to the generator which generated the original range of identifiers.

The disclosed embodiments may be used by verifying and commissioning parties for identification of manufactured items within a batch of manufactured items or for volume verification. The commissioning party may be the manufacturer or another party which pre-defines the range of identifiers to be used, and allocates the manufactured items with identifiers within that range. The second party may be, for example, a national authority who needs to identify a particular manufactured item or determine the precise number of items manufactured.

Each identifier may comprise an identification code plus a signature. In one case, both the commissioning party and second party know the signature. The commissioning party does not, therefore, need to store the signature as long as there is some correlation between one identifier and another within the same batch. If the second party needs to know details of the items manufactured, the commissioning party can provide the identifiers used to the second party. According to the exemplary embodiments, the commissioning party can do this by referring to the range of identifiers defined at the outset, rather than by referring to the individual identifiers used. If the second party needs to know the precise number of items manufactured, for example for tax reasons, or the second party needs to know which identifiers have actually been used, the commissioning party can refer to the range together with those identifiers in the range that are not actually used for manufactured items. This vastly reduces the amount of information that needs to be sent, as compared with prior art arrangements. Additionally, this will enable the second party to be aware of valid codes that have not actually been used for manufactured items, for example to unequivocally determine whether a particular item is genuine.

The unique identifiers—in the described examples, production details—can be defined appropriately depending on the rate of production, so as to minimize data storage requirements. The principle could also be applied to packs of smoking articles, cartons of packs, shipping cases of cartons or pallets of shipping cases. In fact, the principle may be applied to any manufactured item or container for manufactured items.

The disclosed embodiments provide a number of advantages including reduce data storage and transmission requirements for identifiers for manufactured items.

The invention claimed is:

1. A method for storage of data for a batch of manufactured items, the method comprising:
   generating a plurality of unique item identifiers for the batch of manufactured items;
   defining a primary range of the unique item identifiers by identifying an upper limit identifier and a lower limit identifier from the plurality of unique item identifiers, the primary range including at least one first unique item identifier and at least one second unique item identifier, wherein the primary range of unique item identifiers includes at least one secondary range of unique item identifiers, each secondary range of unique item identifiers consisting of one or more second unique item identifiers which are allocated to the manufactured items in the batch, wherein the at least one first unique item identifier is not allocated to the manufactured items in the batch; and
   defining each secondary range of unique item identifiers by storing the upper limit identifier of the primary range and the at least one first unique item identifier of the primary range in storage space.

2. The method of claim 1, wherein each unique identifier of the at least one first unique item identifier is an alphanumeric code.

3. The method of claim 1, wherein each unique identifier of the at least one first unique item identifier includes a counter value.

4. The method of claim 3, wherein each unique identifier of the at least one first unique item identifier further includes a production time value.

5. The method of claim 1, wherein only the lower limit identifier, the upper limit identifier and the at least one first unique item identifier among the primary range of unique item identifiers for the batch are stored.

6. The method of claim 1, further comprising:
   authenticating a manufactured item by comparing a received unique item identifier to the at least one first unique item identifier stored in the storage space.

7. The method of claim 6, wherein the manufactured item is authenticated if the received unique item identifier does not match the at least one first unique item identifier stored in the storage space.

8. The method of claim 1, wherein generating the plurality of unique item identifiers comprises, generating an identification code, providing a plurality of secret codes and digitally signing the identification code using a secret derived from the plurality of secret codes.

9. The method of claim 1, comprising:
   transmitting, over a network, the upper limit identifier of the primary range and the at least one first unique item identifier of the primary range to a processing device of a second party.

* * * * *